UNITED STATES PATENT OFFICE.

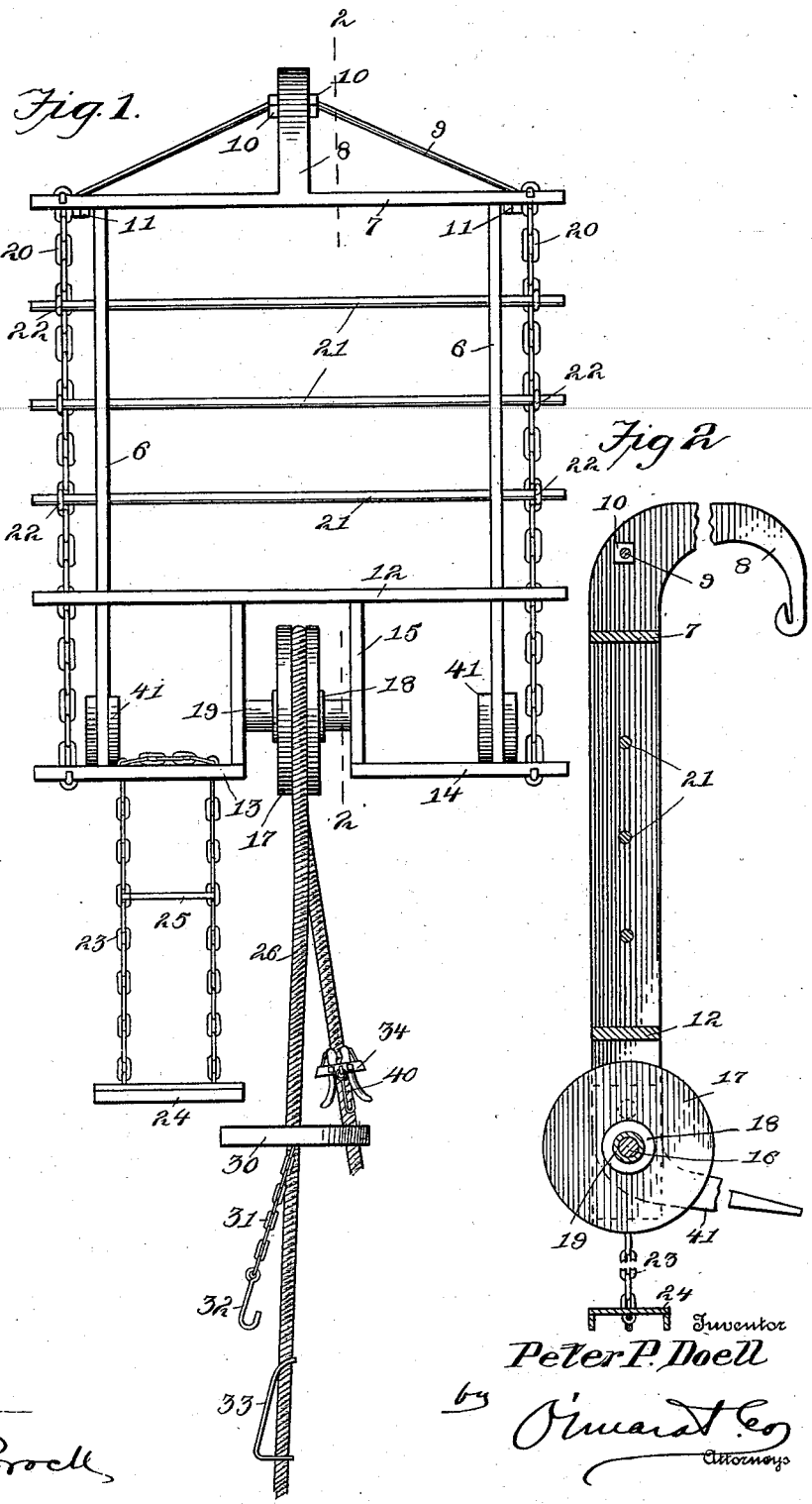

PETER PAUL DOELL, OF NEW YORK, N. Y.

FIRE-ESCAPE.

SPECIFICATION forming part of Letters Patent No. 654,787, dated July 31, 1900.

Application filed June 29, 1899. Serial No. 722,243. (No model.)

*To all whom it may concern:*

Be it known that I, PETER PAUL DOELL, residing at New York, in the county of New York and State of New York, have invented a new and useful Fire-Escape, of which the following is a specification.

My invention relates to fire-escapes for temporary attachment to buildings, and has for its object to generally improve their construction and operation.

With this object in view my invention consists in the improved construction, arrangement, and combination of parts hereinafter fully described and afterward specifically pointed out in the appended claims.

In order to enable others skilled in the art to which my invention most nearly appertains to make and use the same, I will proceed to describe its construction and operation, reference being had to the accompanying drawings, forming part hereof, in which—

Figure 1 is a view of a complete fire-escape constructed in accordance with my invention in front elevation. Fig. 2 is a vertical section through the same on the plane indicated by the broken line 2 2 of Fig. 1, the hook and trapeze-chain being partially broken away to shorten the figure and the rope and its attachments being omitted.

Like numerals of reference mark the same parts wherever they appear in both figures of the drawings.

Referring to the drawings by numerals, 6 6 indicate the sides, and 7 the top, of a frame, from the latter of which projects upward and inward a hook 8, adapted to be engaged on the window-sill or other part of a building, the top being stiffened and strengthened by a diagonal brace-rod 9, extending through the hook and the top near each end and secured by nuts 10 11. The bottom of the frame is indicated at 12, from which the sides 6 6 extend below to horizontal bars 13 14, connected to the bottom by vertical bars 15, in which is secured a shaft 16. A grooved pulley 17 is journaled on the shaft 16, at each side of which, loosely mounted on the shaft, is a washer 18 and a sleeve 19. Outside of the sides 6 6 are chains 20 20, secured to the top 7, bottom 12 and horizontal bars 13 and 14 serving to assist in supporting the bottom and horizontal bars. Rounds or rods 21 pass through holes in the sides 6 6, extending beyond them and engaging in links 22 of the chains, thereby adding great strength to the escape, for if an excessive weight should be placed on the lowering apparatus, which is connected with the lower part of the frame, the rods would assist it in supporting it by adding so many points of attachment or support to the chains. A chain 23 passes through holes in horizontal bar 13 and carries at its lower end a trapeze-seat 24, the sides of the chain being connected at a point between its upper and lower ends by a rod 25. Around the pulley 17 is an endless belt 26, upon which is secured a body-belt 30, a chain 31, with hook 32, a foot-rest or stirrup 33, and a grip or clutch 34. A hook 40 depends from the grip 34, as shown Fig. 1.

41 41 indicate guards pivotally secured to the sides 6 6 of the frame, said guards being bifurcated and straddling the sides, whereby they are prevented from dropping below the horizontal position illustrated in Fig. 2. This is their normal position, being maintained therein by their own gravity; but they may be folded up into vertical position against the inner edges of the sides 6.

With the frame suspended from a window-sill by means of the hook 8 it becomes, in effect, a short ladder held away from the wall of the house by guards 41, and a fireman or other person may clamber out upon it and seat himself on the trapeze. In this position he may lower persons or goods to the ground by means of the endless belt. A person descending will secure the body, preferably under the arms, and engage one or both feet in the stirrup. By grasping the grip and squeezing its levers together the descent may be made as slow or as fast as desired. When brought toward each other, the levers cause the jaws to grip the rope of the endless belt and when sufficient force is applied the descent will be stopped entirely. Should the person secured to the endless belt desire to hold himself at any point and leave his hands free to handle a young, weak, or sick person, or baggage or other articles, it will only be necessary to engage the hook of the body-belt with that of the grip.

The frame may be permanently attached to a building, if desired, but is sufficiently light to be portable, and might be carried with great advantage by firemen on their hose-carriages, engines, or wagons.

Should the rope accidentally slip off the pulley, it will engage on one of the sleeves on the pulley-shaft, which sleeve being free to rotate will enable the rope to continue its motion without undue wear.

While I have illustrated and described what I consider to be the best means now known to me for carrying out my invention, I do not wish to be understood as restricting myself to the exact forms and constructions shown, as many slight changes therein or variations therefrom might suggest themselves to the ordinary mechanic, all of which would be clearly included within the limit and scope of my invention.

Having thus fully described my invention, what I claim as new, and desire to secure by Letters Patent of the United States, is—

1. In a fire-escape, a frame comprising side bars and a top bar and a bottom bar, a hook projecting upward and inward from the top bar, chains connecting the top and bottom bars outside the side bars, and rounds or rods engaged in holes in the side bars and with the links of the chains, all combined and arranged, substantially as described.

2. In a fire-escape, a frame comprising a top bar, a hook erected thereon, a bent rod connecting the hook with the ends of the top bar, a bottom bar, side bars extended below the bottom bar, chains connecting the top and bottom bars, rounds passing through the side bars and through the links of the chains, vertical bars depending from the bottom bars, horizontal bars connecting the vertical bars with the lower extended ends of the sides, a shaft in the vertical bars and a grooved pulley journaled on the shaft, all combined, substantially as described.

3. In a fire-escape, a ladder-frame, a hook for suspending it from a window-sill, a pulley journaled in the frame, an endless belt around the pulley, and a trapeze-seat suspended from the frame adjacent to the pulley, all combined, substantially as described.

PETER PAUL DOELL.

Witnesses:
HERMAN CHITTELMANN,
ANICET BALTHEWS.